(12) United States Patent
Takeshita

(10) Patent No.: US 7,593,844 B1
(45) Date of Patent: Sep. 22, 2009

(54) DOCUMENT TRANSLATION SYSTEMS AND METHODS EMPLOYING TRANSLATION MEMORIES

(75) Inventor: Shohichiro Takeshita, Tama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/235,311

(22) Filed: Sep. 22, 2008

(51) Int. Cl.
*G06F 17/28* (2006.01)
(52) U.S. Cl. .............................. 704/2; 704/8; 704/277
(58) Field of Classification Search .......... 204/8, 204/2, 277
See application file for complete search history.

(56) References Cited

U.S. PATENT DOCUMENTS

| | | | |
|---|---|---|---|
| 6,876,963 B1 | 4/2005 | Miyahira et al. | |
| 6,996,520 B2 | 2/2006 | Levin | |
| 2006/0206304 A1* | 9/2006 | Liu | 704/2 |

FOREIGN PATENT DOCUMENTS

EP     0932871 B1     4/2002

OTHER PUBLICATIONS

IBM Tool-2002 summarized in Information Disclosure Statement Letter, 2002.
IBM TranslationManager summarized in Information Disclosure Statement Letter, 2002.

* cited by examiner

*Primary Examiner*—Huyen X. Vo
(74) *Attorney, Agent, or Firm*—Jackson Patent Law Office

(57) ABSTRACT

Disclosed are systems and methods for translating documents.

1 Claim, 14 Drawing Sheets

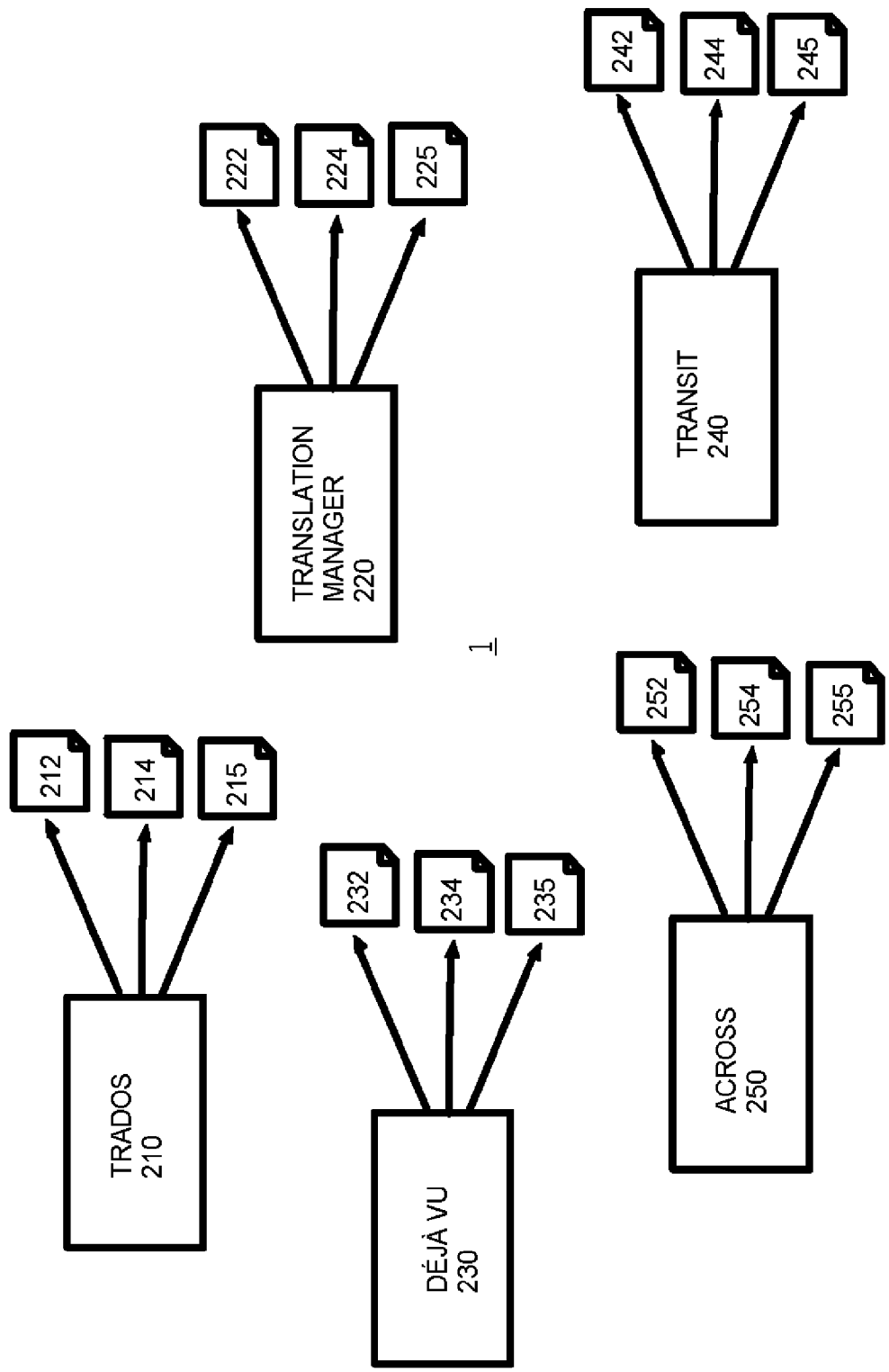

212

|  | Source File | | Translation Memory A | | Translation Memory B | |
|---|---|---|---|---|---|---|
|  | Unique Keys (Source) | Occurrence of Keys (Source) | Existence of Keys (Memory A) | Occurrence of Keys (Memory A) | Existence of Keys (Memory B) | Occurrence of Keys (Memory B) |
|  | wkcmjf | 1 | Yes | 1 | Yes | 5 (bigger) |
|  | ttfghkw | 5 | Yes | 4 | No | 0 |
|  | alofpsmghjike | 8 | Yes | 9 (bigger) | Yes | 3 |
|  | stlklkfl | 4 | Yes | 3 | Yes | 2 |
|  | cmngklypiwa | 2 | No | 0 | Yes | 10 (bigger) |
| Metrics |  | 20 | Hit Ratio: 4/5 = 80% | Cover Ratio: 16/20 = 80% | Hit Ratio: 4/5 = 80% | Cover Ratio: 8/20 = 40% |
|  |  |  | Metric 1 | Metric 2 | Metric 1 | Metric 2 |

Figure 11

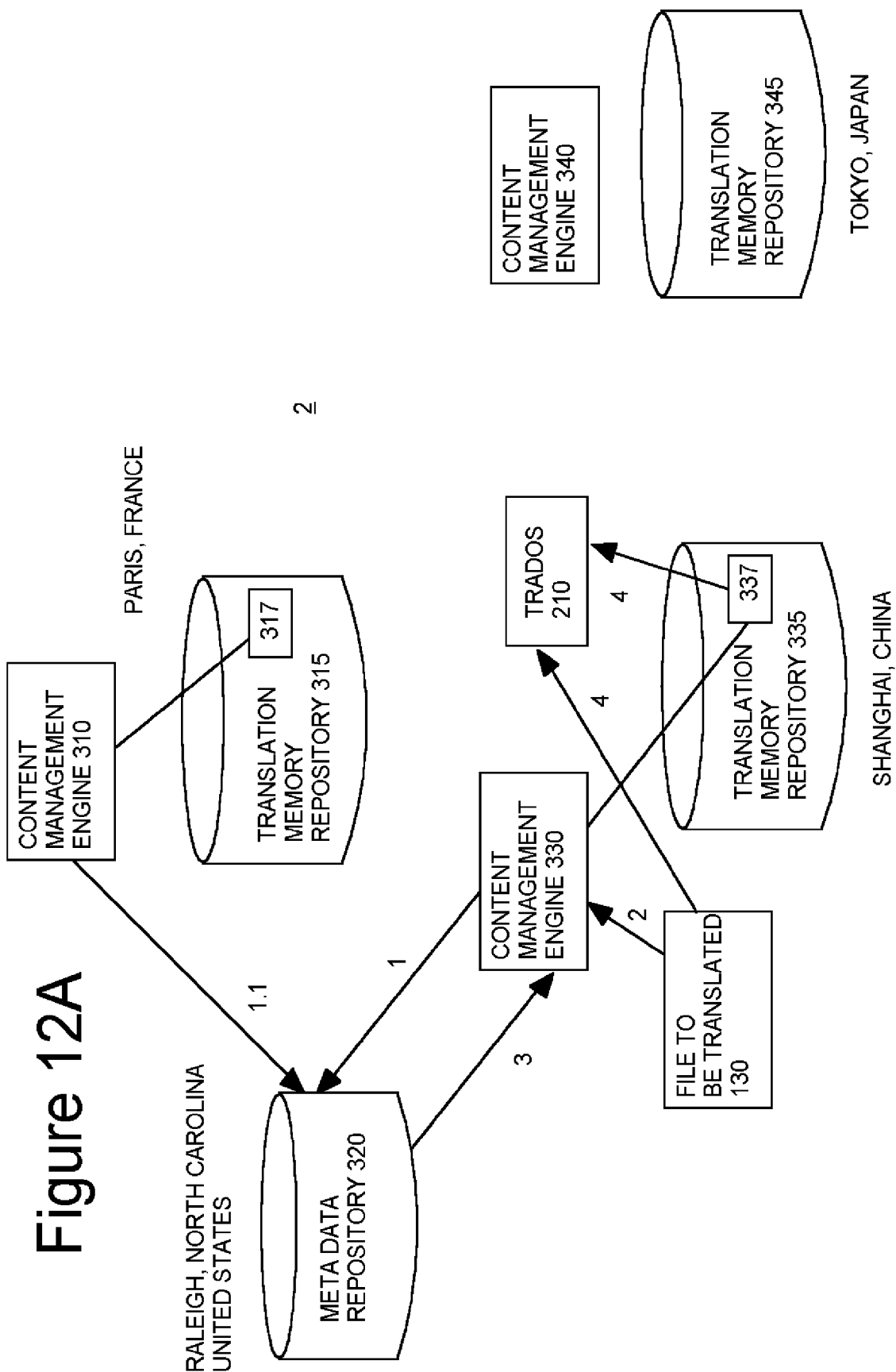

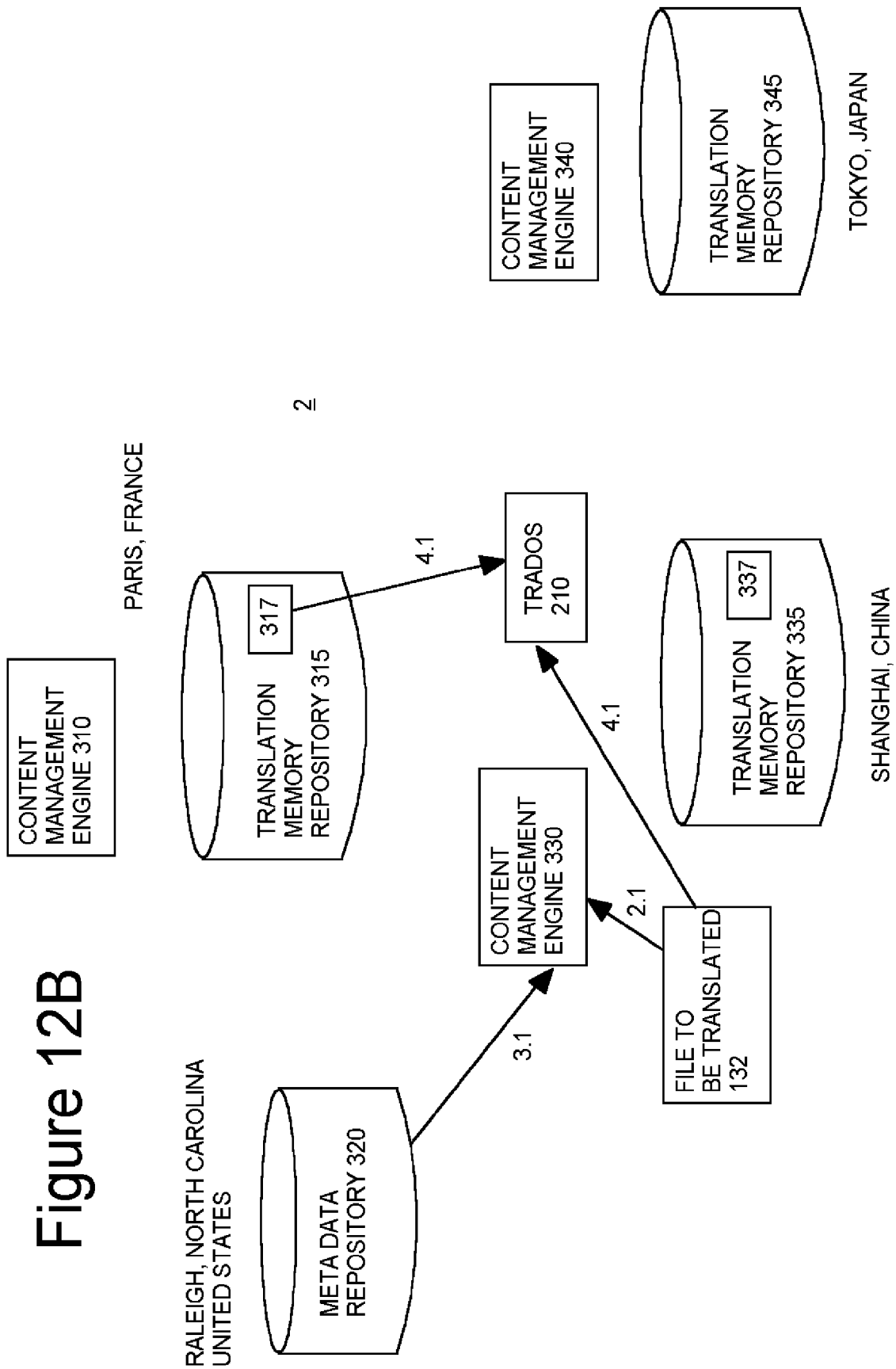

US 7,593,844 B1

DOCUMENT TRANSLATION SYSTEMS AND METHODS EMPLOYING TRANSLATION MEMORIES

BACKGROUND OF THE INVENTION

1. Field of the Invention

This invention relates generally to systems and methods of translating documents and, more particularly, to systems and methods employing translation memories to translate documents.

2. Description of Related Art

One type of automatic translation involves finding a sentence or phrase of text, of one language, in a database with its counterpart translation in another language. The translation of a term may differ by industry domain (such as medicine or Information technology), and by a more specific context, such as a manual for a certain product. Counterpart translation is intended to be the domain (idiom/context) specific translation of the text.

SUMMARY OF THE INVENTION

There is a method for operating with a system including a first memory having a plurality of sets in a native format of a first computer program, each set including a first part in a first human language and a corresponding second part in a second human language; and a second memory having a plurality of sets in a native format of a second computer program, each set including a first part in the first human language and a corresponding second part in the second human language. The method comprises receiving the first memory; generating a representation, of the first parts of the first memory, in a third format; writing the representation generated in the previous step into an index of a database; receiving the second memory; generating a representation, of the first parts of the second memory, in the third format; writing the representation generated in the previous step into the index; receiving text to be translated; correlating the text to be translated with the first memory and with the second memory, by searching the index; selecting a memory, depending on the correlating step; and translating the file by reading second parts of the selected memory.

BRIEF DESCRIPTION OF THE DRAWINGS

References are made to the following text taken in connection with the accompanying drawings, in which:

FIGS. 1A and 1B constitute a diagram showing various structures in a first exemplary system.

FIG. 11 is a diagram for describing details of an exemplary method for selecting a translation memory.

FIGS. 12A and 12B are diagrams showing various structures in a second exemplary system.

The accompanying drawings which are incorporated in and which constitute a part of this specification illustrate embodiments of the invention and, together with the description, explain the principles of the invention, and additional advantages thereof. Certain drawings are not necessarily to scale, and certain features may be shown larger than relative actual size to facilitate a more clear description of those features. Throughout the drawings, corresponding elements are labeled with corresponding reference numbers.

DETAILED DESCRIPTION OF EXEMPLARY EMBODIMENTS

First Exemplary System

Figure 1B:
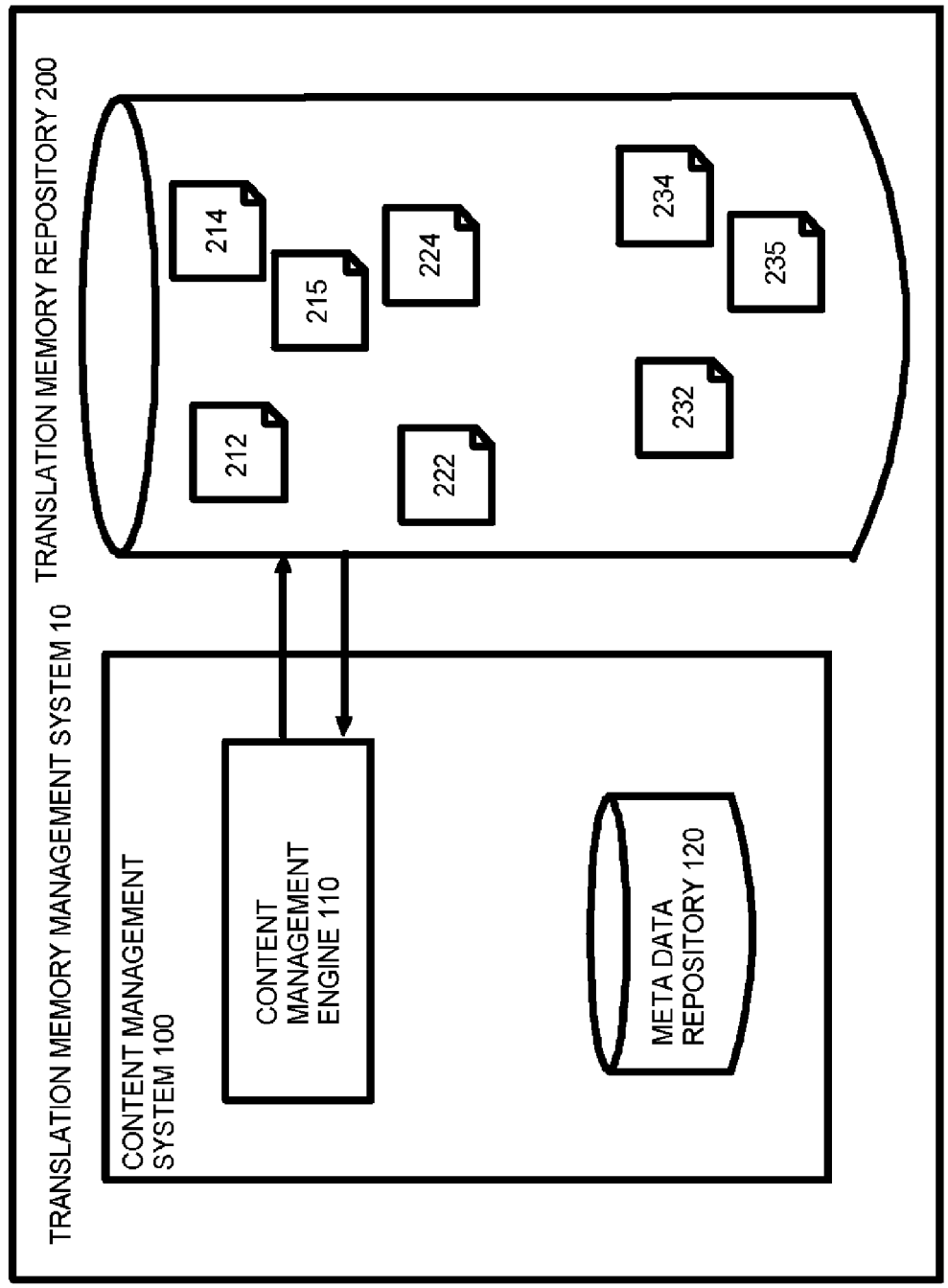

FIGS. 1A and 1B show system 1 according to an exemplary embodiment of the present invention. Translation memory tool 210, "TRADOS"™, generates translation memories 212, 214, and 215. Each of memories 212, 214, and 215 includes a plurality of segments.

Each of memories 212, 214, and 215 share a common format. Translation memory tool 210 includes logic to search for specified text strings in segments of files having the format of memories 212, 214, and 215.

Translation memory tool 220, "TRANSLATION MANAGER", generates translation memories 222, 224, and 225. Each of memories 222, 224, and 225 includes a plurality of segments. A typical segment may include an English language sentence and a translation for the English-language sentence into another language, such as Japanese or French.

Each of memories to 222, 224, and 225 share a common format different from the format of memories to 212, 214, and 215. These respective formats are sometimes called the "native" format of a tool.

Translation memory tool 220 includes logic to search for specified text strings in segments of files having the format of memories 222, 224, and 225. Translation memory tool 220 cannot process data in the native format of memory tool 210; translation memory tool 220 does not include logic to search for specified text strings in segments of files having the format of memories 212, 214, and 215.

Translation memory tool 210 does not include logic to search for specified text strings in segments of files having the format of memories 232, 234, and 235. Thus, each segment of a translation memory is essentially a set including 2 parts. Translation memory 214, for example, includes a plurality of text sets in the native format of tool 210, each set including a first part in a first human language and a corresponding second part in a second human language. Translation memory 234 includes a plurality of text sets in the native format of tool 230, each set including a first part in the first human language and a corresponding second part in the second human language.

Figure 2:
FIG. 2 shows the translation memory in the native format of a translation memory tool.
Figure 2:
Figure 2:
Figure 2:

FIG. 2 shows memory 212 in more detail. Memory 212 includes a plurality of segments 141, in the native format of tool 210. Each segment 141 is a unit of translation. Each segment 141 includes an English language part 143 and a corresponding French language part 145 that is a translation for the English-language part 143. The English language part 143 is typically a sentence, and may be deemed the "source"

part of segment 141. The French language part 145 is typically a sentence, and may be deemed the "target" part of segment 141.

Table 1 below shows the structure of one of the segments 141 shown in FIG. 2.

TABLE 1

<TrU>
<CrD>17042008, 15:51:53
<CrU>TERESA
<Att L=GPP 3.1 JPN>Others
<Seg L=EN-US>The two ends of the workpiece can be machined simultaneously without displacing the workpiece to convey it from a first slide to the other.
<Seg L=FR>Les deux extrémités de la piéce peuvent étre usinées simultanément sans déplacer la piéce pour l'amener d'un premier coulant vers l'autre.
</TrU>

In Table 1, the text "<TrU>" indicates the start of a segment (a pair of memory blocks). The text "<CrD>" delimits the date and time of this segment's creation. The text "<CrU>" delimits the user name (TERESA) who created this memory block. The text "<Att=GPP 3.1 JPN>" delimits the user name (Others) who updated this memory block. The text "<Seg L=EN-US>" delimits the source sentence to be translated with its language (EN-US=U.S. English). The text "<Seg L=FR>" delimits the target (translated) sentence with its language name (FR=French). The text "</TrU>" indicates the end of a pair of memory blocks.

Figure 3:
FIG. 3 shows another memory in the native format of another translation memory tool.
Figure 3:
Figure 3:
Figure 3:

FIG. 3 shows memory 224 in more detail. Memory 224 includes a plurality of segments 151, in the native format of tool 220. Each segment 151 is a unit of translation. Each segment 151 includes an English language part 153 and a corresponding French language part 155 that is a translation for the English-language part 153. The English language part 153 is typically a sentence, and may be deemed the "source" part of segment 151. The French language part 155 is typically a sentence, and may be deemed the "target" part of segment 151.

Table 2 below shows the structure of one of the segments 151 shown in FIG. 3.

TABLE 2

<Segment>0000000001
<Control>
000007⊥ 0⊥ 00000011920571921⊥ English(U.S.)⊥ French⊥ ⊥ IBMXML⊥ R_CMD_BA.000⊥ introduction.html
</Control>
<Source> The two ends of the workpiece can be machined simultaneously without displacing the workpiece to convey it from a first slide to the other.</Source>
<Target>Les deux extrémités de la piéce peuvent étre usinées simultanément sans déplacer la piéce pour l'amener d'un premier coulant vers l'autre.</Target>
</Segment>

In Table 2, the text "<segment>" indicates the start of a segment (a pair of memory blocks), and the number immediately following (in this case 0000000001) is a number assigned to the segment. The text "<control>" indicates the start of a control block and delimits information including the date and time of this memory blocks creation and the source and target languages. Within the control block, the first 26 bytes are used internally. Subsequently, English(U.S)=source language name; French=target language name; IBMXML=segmentation rule, which is unique to TranslationManager; R_CMD_BA.000=The folder name to store memory blocks, which is unique to TranslationManager; and introduction.html=The file name where the source segment exists. </Control> Indicates the end of control block.

The text "<source>" delimits the source sentence to be translated. The text "<Target>" delimits the target (translated) sentence. The text "</Segment>" indicates the end of the segment.

Thus, there are multiple differences between the native format of tool 210 and the native format of tool 220. For example, in the tool 210 native format, each source part of a segment is delimited by a common first data pattern (<Seg . . . >); while, in the tool 220 native format, each source part of a segment is delimited by a common second data pattern (<Source>) different from the common first data pattern.

System 1 includes content management system 100, having metadata repository 120 that stores attributes for each pair of segments (source language and target languages), of the translation memories in translation memory repository 200.

Translation memory repository 200 stores translation memories in various tools' formats.

Information in metadata repository 120 includes attributes such as word count, subject area, project/product information, and key. This metadata, including keys and metric quantities, is stored separately from the source/target pairs of the translation memories in translation memory repository 200.

Translation Memory Registration

Figure 4:
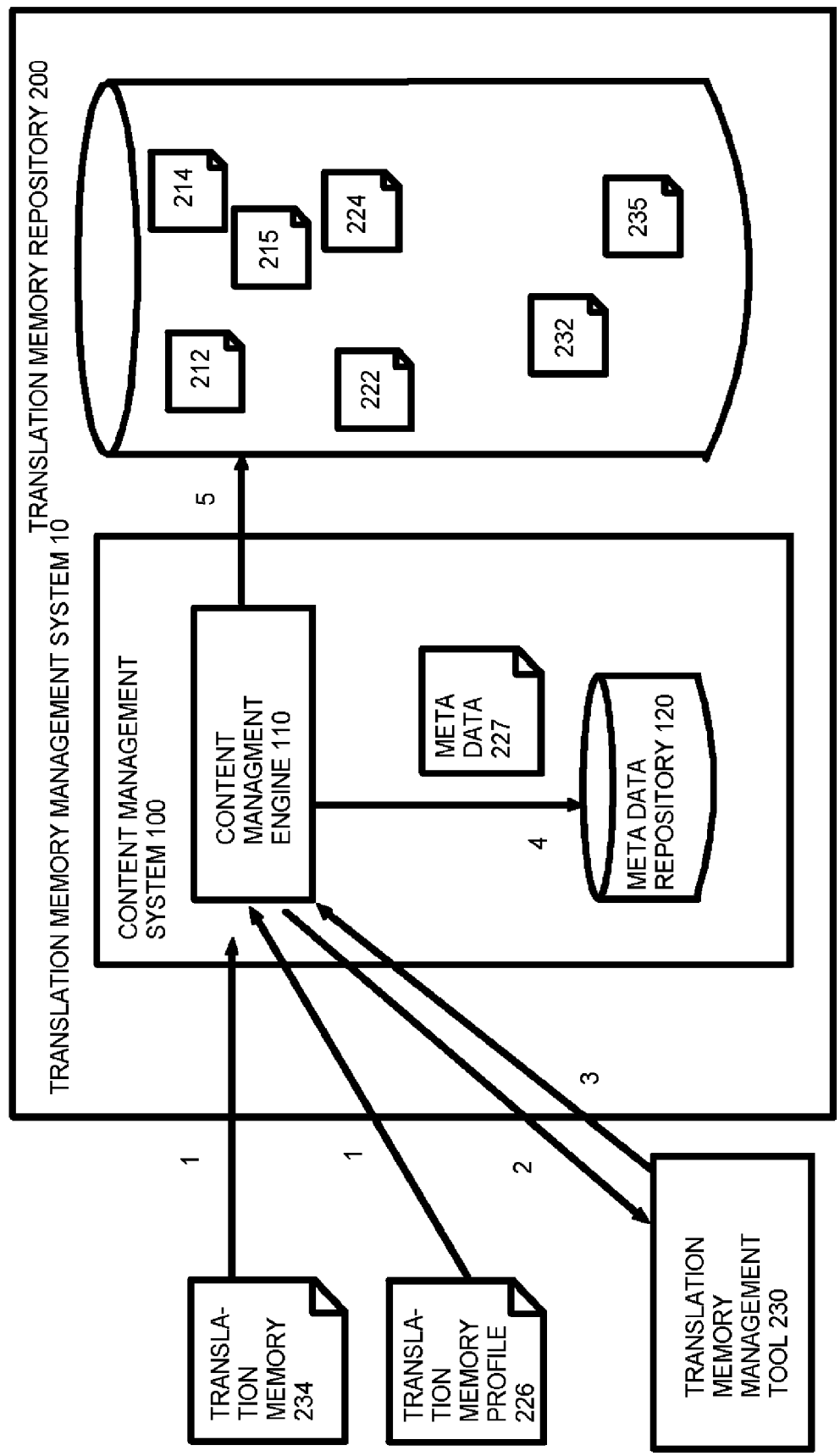
FIG. 4 is a diagram depicting a process performed by the first exemplary system.

FIG. 4 depicts a process in which a user has a translation memory 234 that was generated by a tool, in this case tool 230. Thus, translation memory 234 is in the native format of tool 230.

Translation memory 234 is to be stored in the translation memory management system 10, hereinafter called TMMS 10. The user invokes TMMS 10 to store the translation memory 234 in TMMS 10 by providing translation memory 234 and the associated profile information 226. Profile information 226 may include a translation memory management tool name, service requester (customer) name and product name.

Content management engine 110 extracts the source parts of the segments from translation memory 234. To perform this extraction, engine 100 may use the text export function of the specified translation memory management tool.

Engine 110 generates a key for each extracted source part of translation memory 234. Usually, a key will be shorter than its corresponding source part, as described in more detail below.

Content management engine 110 writes the keys into an index in repository 120 and writes metadata, in a format of repository 120, into repository 120; and writes translation memory 234 into translation memory repository 200. Each key is essentially a representation of the source part of a segment.

In other words, a translation memory in a native tool format and its profile are sent to TMMS10. (step 1 depicted in FIG. 4). Engine 110 invokes translation memory management tool 230, which created memory 234, to export source parts of the segments of memory 234. (step 2). Translation Memory Management Tool 230 exports these source parts and returns them to content management engine 110. (step 3). (The functions of steps 2 and 3 could be implemented within content engine 110, thereby eliminating the need to invoke tool 230 for the extraction function).

Engine 110 generates the key for each source part. Engine 110 generates each key according to the content of the source part. In this exemplary implementation, this key is no longer than 24 bytes. (The text of a typical source part is more than 24 bytes).

Engine 110 writes each generated key, in association with information about translation memory from which the key was generated, into the index in repository 120, as described in more detail below in connection with FIG. 8. (step 4).

Content management engine 110 writes the translation memory, in its native format, into translation memory repository 200. (step 5).

In other words, tool 230 generates translation memory 234 in a format native to tool 230. Tool 230 reads memory 234 and generates source parts in an export format.

Content management engine 110 receives the exported source parts of memory 234, to generate a key for each source part of memory 234, responsive to a content of the source part of memory 234.

Content management engine 110 writes the generated keys into a data structure (the index) in repository 120.

Content management engine 110 writes the translation memory 234, in its native format, into a data structure in translation memory repository 200.

Tool 210 generates translation memory 212 in a format native to tool 210. Content management engine 110 then generates a key for each source part of memory 212, responsive to a content of the source part of memory 212. Content management engine 110 writes these generated keys into the data structure (the index) in repository 120. Content management engine 110 writes the translation memory 212, in its native format, into a data structure in translation memory repository 200.

Tool 220 generates translation memory 224 in a format native to tool 220. Content management engine 110 then generates a key for each source part of memory 224, responsive to a content of the source part of memory 224. Content management engine 110 writes these generated keys into the data structure (the index) in repository 120. Content management engine 110 writes the translation memory 224, in its native format, into a data structure in translation memory repository 200.

Use Case: Previous Translation Memory Search

Figure 5:
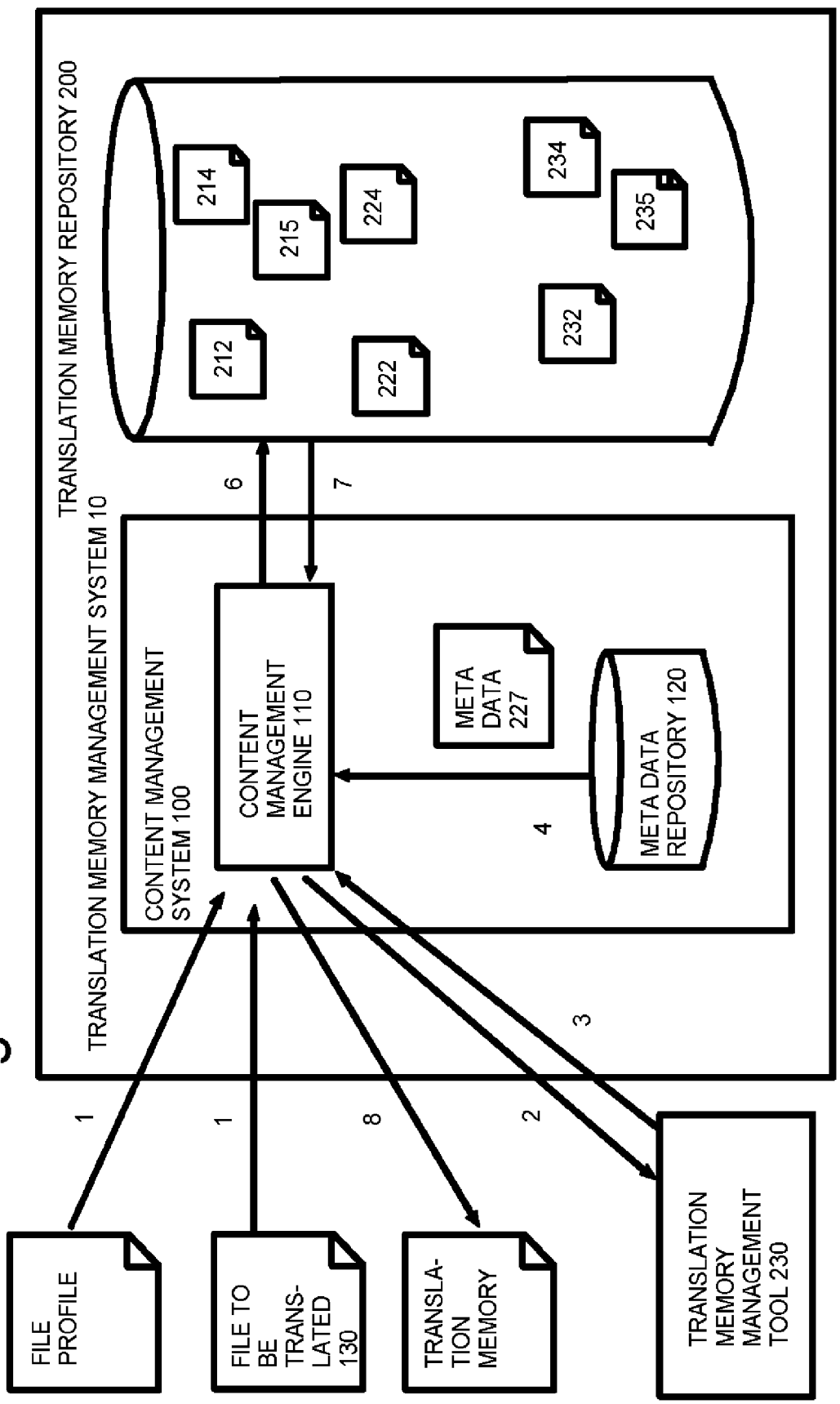
FIG. 5 is a diagram depicting another process performed by the first exemplary system.

FIG. 5 depicts a process in which a user receives a translation request for the new version of a product. The translation memories of the previous version and related products are stored in translation memory repository 200 in the native format. The corresponding keys and metadata are stored in Metadata Repository 120. The user invokes content management engine 110 to search previous translation segment key in Metadata Repository 120. The user provides file(s) to be translated and search conditions (such as translation memory management tool name, service requester (customer) name, and product name).

A suitable translation memory and the translation memory management tool is selected based on the results.

Figure 6:
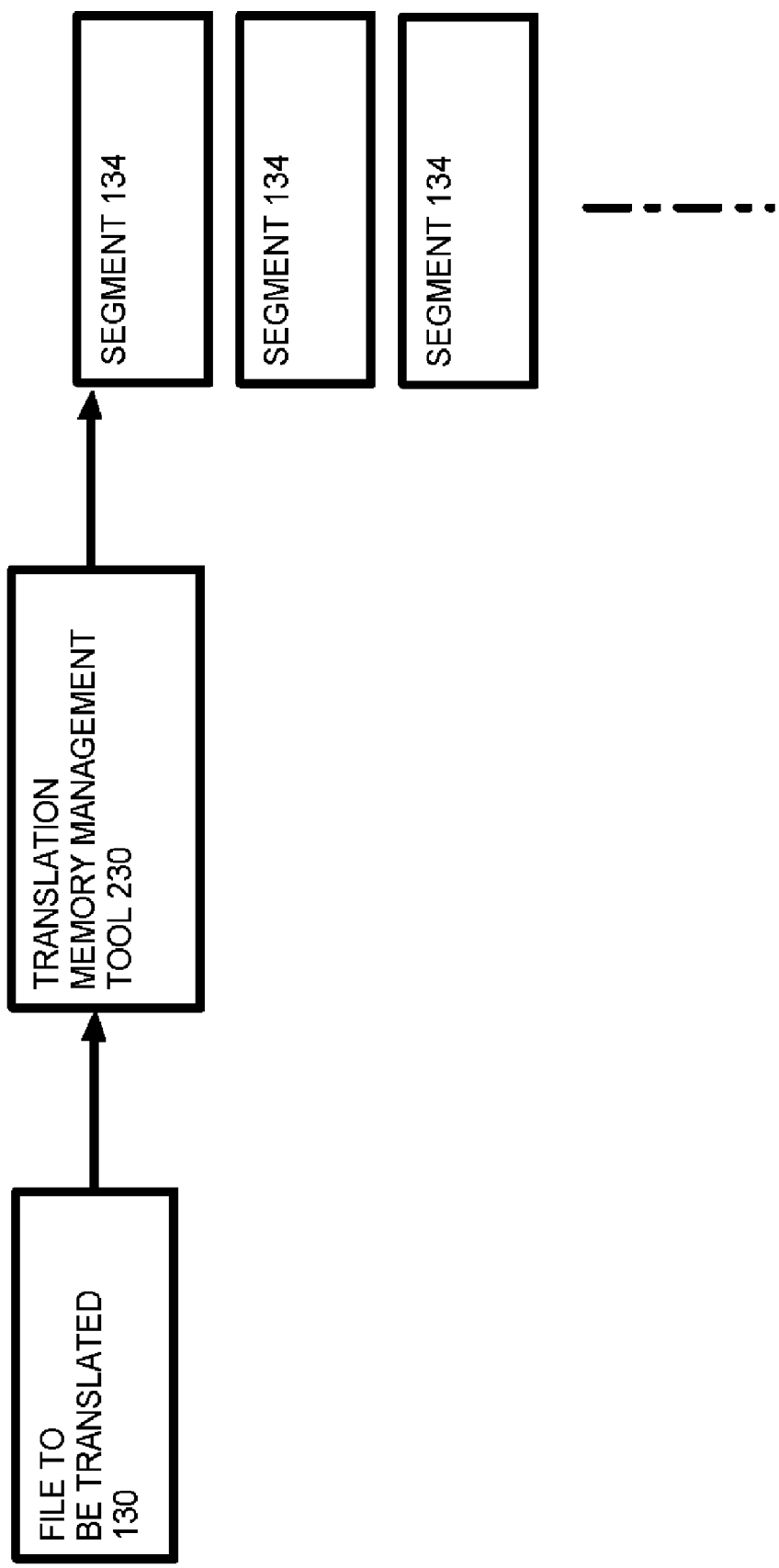
FIG. 6 is a diagram for describing a stage of translating a file.

As shown in FIG. 6, content management engine 110 creates segments (a segment is a unit of translation) from text in file 130 to be translated. Content management engine 110 creates the segments by using the segmentation function of the specified translation memory management tool, in this case, tool 230.

Figure 7:
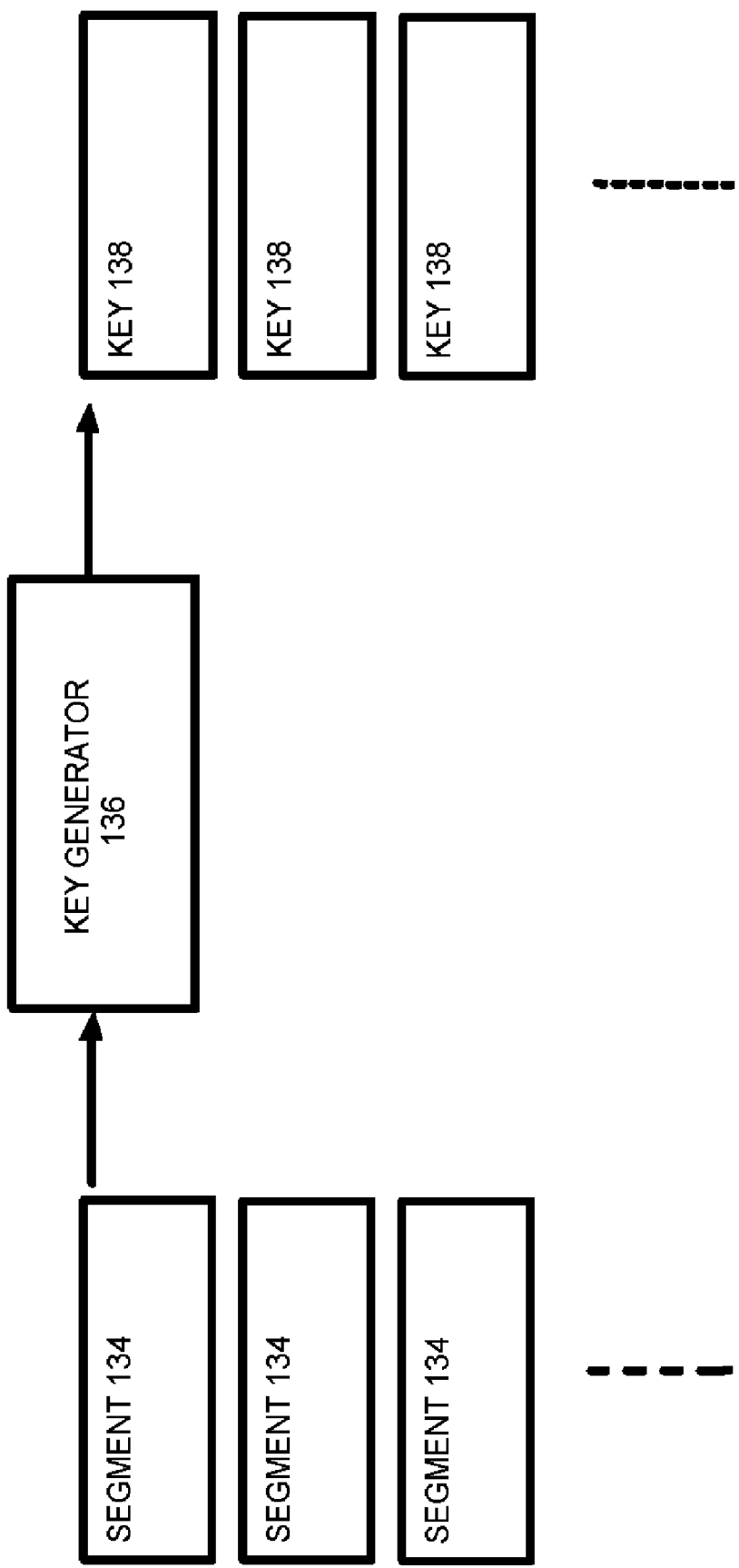
FIG. 7 is a diagram for describing a subsequent stage of translating the file.

As shown in FIG. 7, key generator 136 is software in content management engine 110. Key generator 136 generates a key 138 for each segment.

Content management engine 110 compares keys 138 to keys 137 in metadata repository 120.

Figure 8:
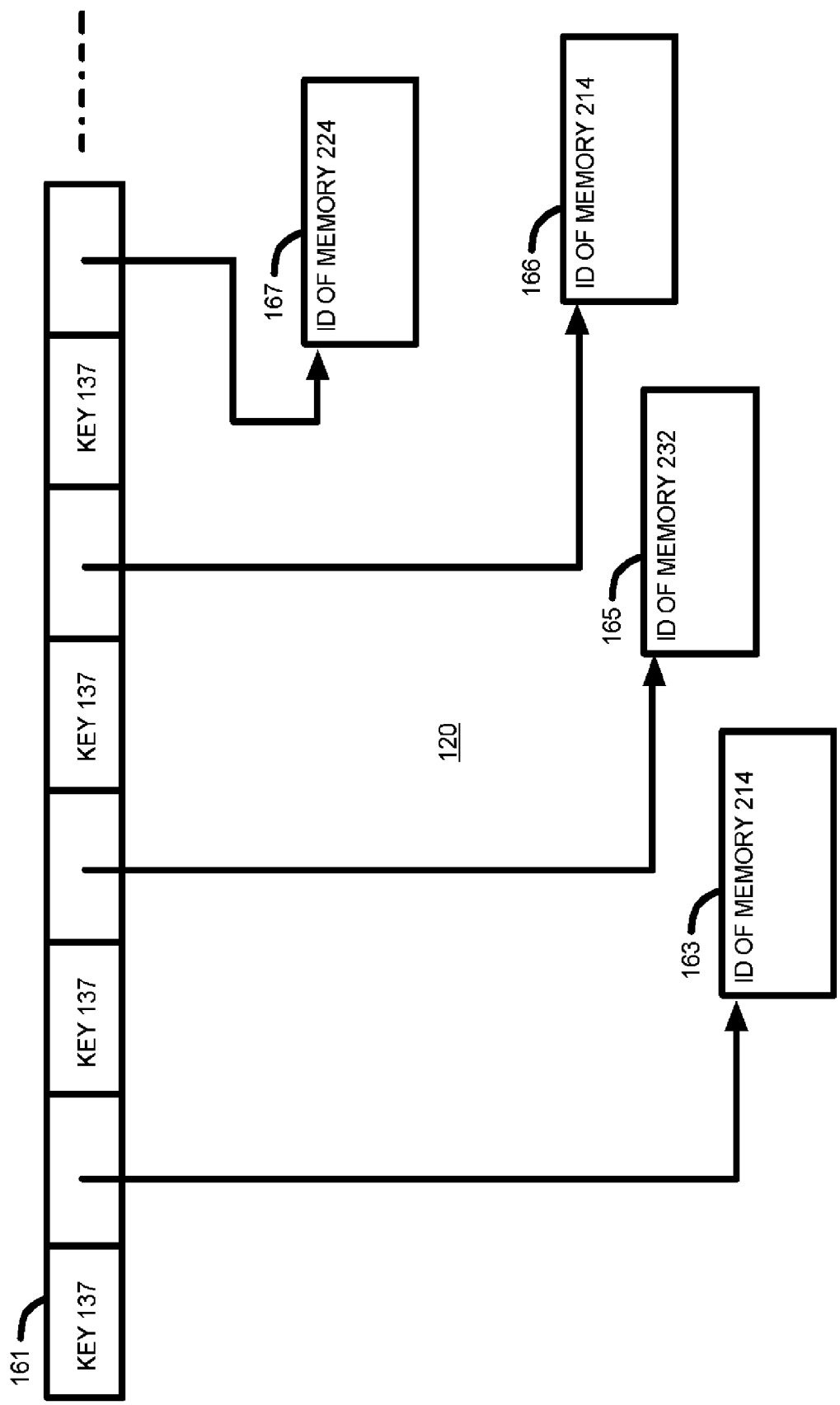
FIG. 8 shows a data structure employed in yet another subsequent stage of translating the file.

FIG. 8 shows metadata repository 120 in more detail. Repository 120 includes a table and an index 161 in the table. Index 161 is populated by keys 137. Index 161 includes a respective pointer for each key 137. Each pointer indicates a memory block, or table row, corresponding to the key 137.

The indicated memory block, such as memory block 163, includes an identification of a translation memory. The identification of the translation memory could include a URL.

Repository 120 also includes memory description data, such as the word count of the translation memory, the subject area of translation memory, and other information such as project or product information. This description data for the translation memory is present in memory block 163, or is accessed via a pointer in memory block 163.

Each of the other memory blocks 165, 166, and 167 shown in FIG. 8 corresponds to a respective one of the other keys 137 shown.

In other words, referring to FIG. 5, a file to be translated and its profile (such as source language, target language, translation memory management tool name, and customer name; used as search conditions) are sent to TMMS 10. (step 1). Content management engine 110 invokes Translation Memory Management Tool 230 to do the segmentation of source text in the given file. (step 2). Translation Memory Management Tool 230 does the segmentation of the file to be translated, generates source parts, and sends the source parts to content management engine 110. (step 3). Content management engine 110 generates a key for each source part and searches for the keys in Metadata Repository 120. Content management engine 110 generates metrics based on the search results, as described in more detail below. (step 4).

Content management engine 110 selects a translation memory, depending on one or more of the metrics generated in step 4. Engine 110 requests translation memory repository 200 to provide the selected translation. (step 6).

Translation memory repository 200 sends requested translation memories to Content management engine 110. (step 7).

TMMS 10 provides a translation memory to be used to translate the file. (step 8). The user then invokes one of tools 210, 220, 230, 240, or 250 to translate the file using the provided translation memory. Each of 210, 220, 230, 240, or 250 is a respective set of computer instructions, or respective computer program.

In other words, the process of selecting a translation memory includes receiving a file to be translated and its profile (profile could include source language, target language, translation memory management tool name, and customer name), and segmenting the received files to generate source parts in accordance with a content of the received file.

Engine 110 generates a plurality of keys, each key corresponding to a source part, and searches for the plurality of keys in repository 120. Engine 110 generates one or more metrics, in accordance with a result of the searching. Engine 110 selects a translation memory in accordance with the metric or metrics.

Subsequently, engine 110 receives receiving text to be translated, and selects a translation memory by generating a metric, to correlate the text to be translated with a content of repository 120.

In other words, engine 110 correlates text to be translated with a plurality of candidate translation memories, by searching index 161; and one of the candidate memories is selected, depending on the correlating step.

One of tools 210, 220, 230, 240, or 250 is then used to translate the text by reading second parts of the selected memory.

Thus, when searching for the best translation memory to use to translate a particular file, there will be cases where the user segments the file with tool X, but content management engine 110 proposes a translation memory in the native format of tool Y. In other words, the translation memory selection can be performed without regard to native format of the translation memory, because engine 110 uses the metadata, which is common to all translation memories.

A More Detailed Example—Metrics

Figure 9:
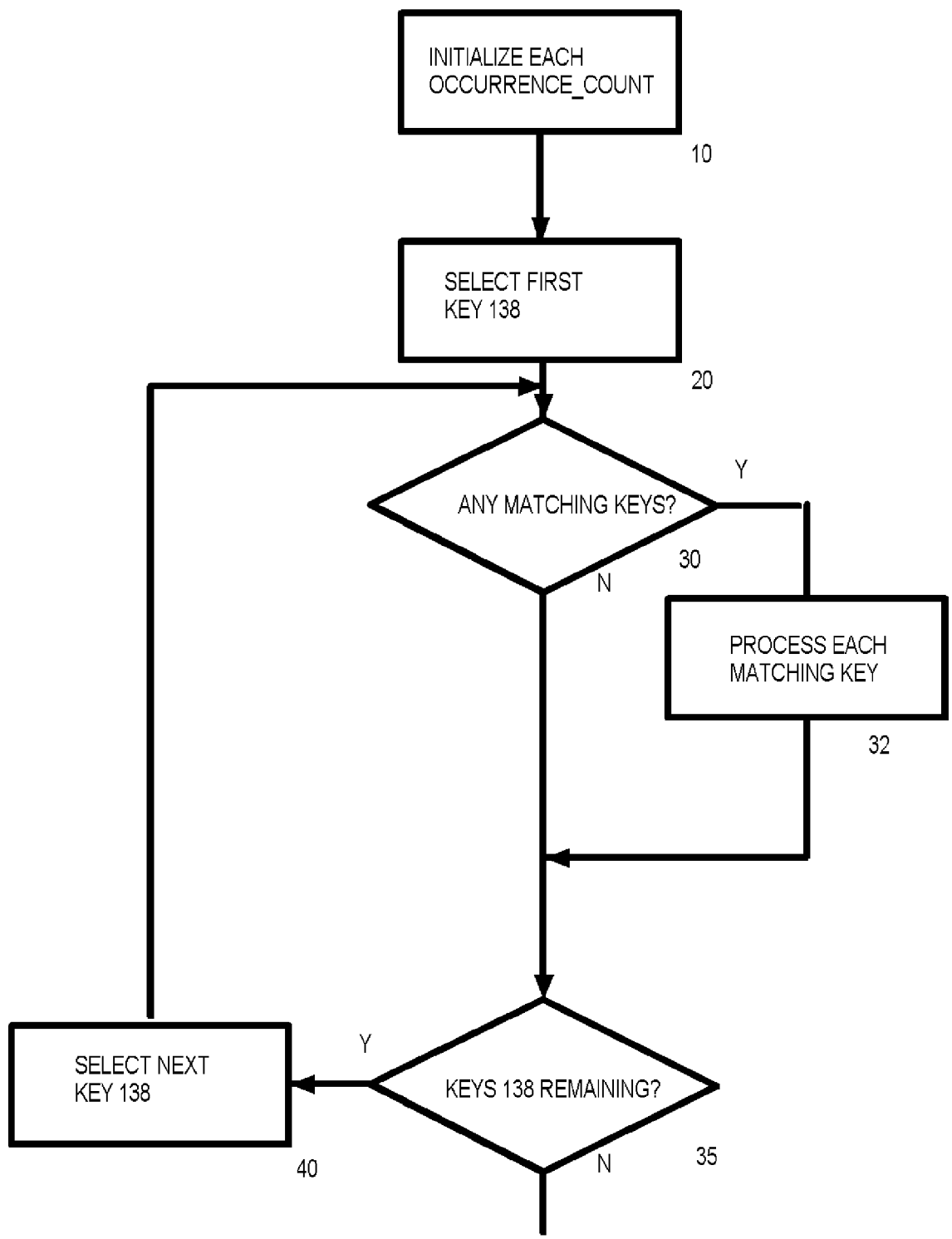
FIG. 9 is a flowchart for the describing a stage of translating the file.

FIG. 9 shows an implementation of step 4 of FIG. 5 in more detail. Content management engine 110 maintains a respective variable, OCCURRENCE_COUNT, for each translation memory in repository 200. Engine 100 initializes each OCCURRENCE_COUNT variable to 0. (step 10). Engine 110 selects the first key 138. (step 20). Engine 110 searches for the currently selected key 138 among the keys 137 in repository 120. If a match is found (step 30), engine 110 processes each matching entry in repository 120 (step 32). If there is a key 138 remaining to be processed (step 35), engine 110 selects the next key 138 (step 40) and processing proceeds to step 30.

Figure 10:
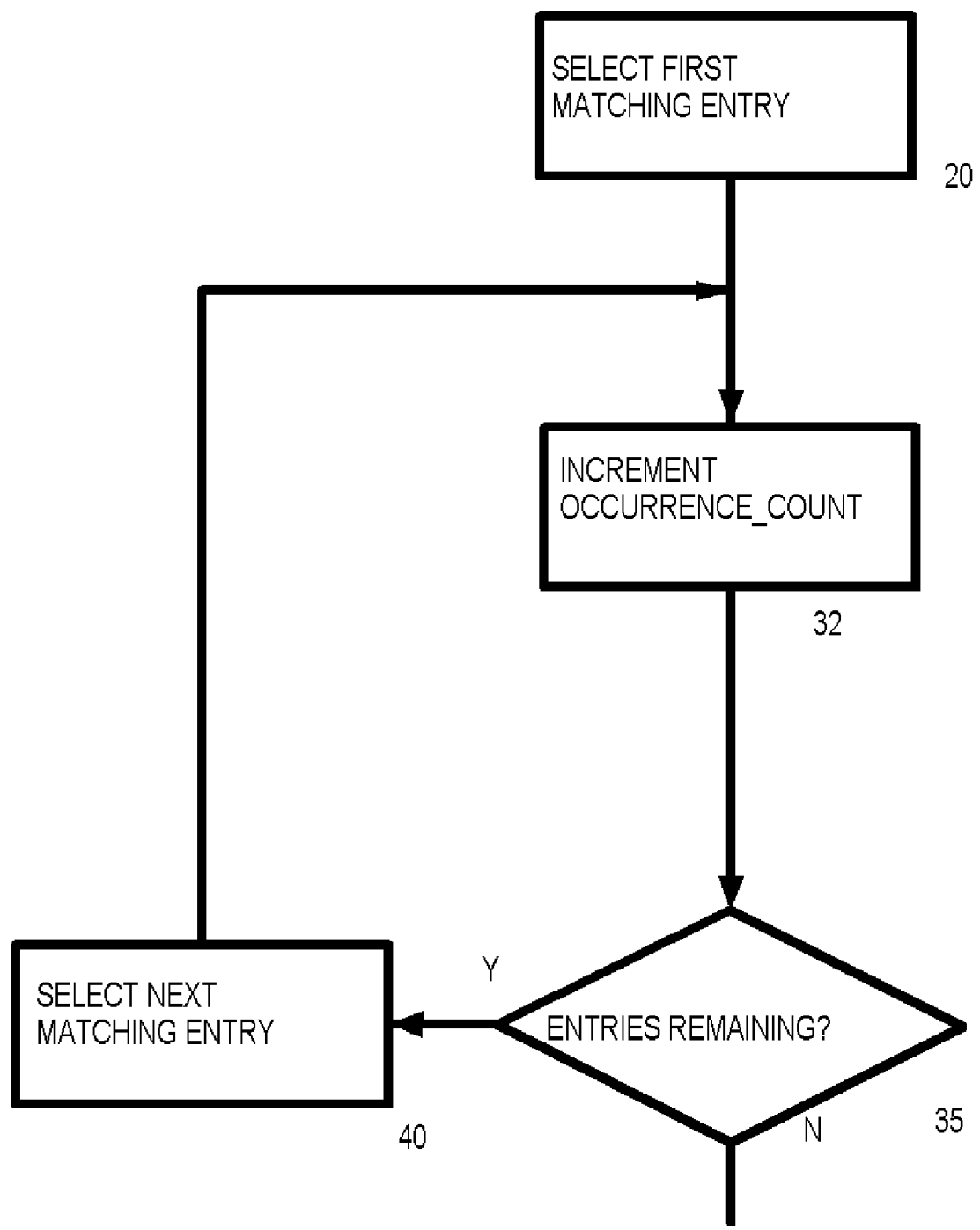
FIG. 10 is a flowchart showing a step of the process of FIG. 9 in more detail.

FIG. 10 shows step 32 of FIG. 9 in more detail. Engine 110 selects the first matching entry in repository 120 (step 20). Engine 110 increments the occurrence count for the dictionary identified in the matching entry (OCCURRENCE_COUNT=OCCURRENCE_COUNT+1). (step 32). If there are matching entries remaining to be processed for the presently selected key 138 (step 35), engine 110 selects the next matching entry (step 40) and processing proceeds to step 32.

Using the occurrence counts generated by the process of FIG. 9, content management engine 110 generates 4 metrics: metric 1: hit ratio, metric 2: cover ratio, metric 3: cover ratio after normalization, and metric 4: inner product after normalization.

Content management engine 110 selects proper translation memories by using the four metrics (each metric alone or combination of multiple metrics).

Metric 1 relates to a hit ratio, which is the percentage of the source's unique keys found in a translation memory.

Metric 2 relates to a cover ratio, which is the percentage of all of the source's keys found in a translation memory.

Metric 3 relates to a cover ratio after normalization, which is the normalized metric 2.

Metric 4 relates to an inner product after normalization, which is an inner product after normalizing each occurrence of key in a translation memory.

FIG. 11 describes metric 1 and metric 2. There are five unique keys in a sample English source file (column 1 from left). The occurrence of each key in the English source file is shown in column 2 from left. The total number of segments (=keys) in the English source file is 20.

Columns 3 and 5 from left show whether each key exists in Memory A or Memory B, respectively.

Columns 4 and 6 from left show the number of the occurrence of each key in Memory A or Memory B, respectively.

Hit ratio (Metric 1) is calculated by the number of "Yes" divided by the number of unique keys.

Cover ratio (Metric 2) is calculated by the sum of keys' occurrence in memory divided by the total number of segments (=keys) in the English source file.

If the occurrence count of a key in memory is bigger than the occurrence count of the key in source, the occurrence count of the key in source is used.

In this example, the hit ratio is the same but the cover ratio of Memory A is two times bigger than the one of Memory B. The cover ratio is used as a metric to indicate a level of similarity between the source that is going to be translated and the source from which translation memory is created. Because of bigger cover ratio, Memory A would be selected.

Because the translation of the same English source part could be different by domain or context, use of both Memory A and Memory B is typically contraindicated. Translators, who are not subject matter experts may not be able to select a proper translation if multiple translations are proposed. It is better to only use translation memory, which is reviewed by subject matter experts, with more similarity in this case.

Metric 3, cover ratio after normalization, may be employed because, when calculating cover ratio, if the number of segments in memory is so different than the one in source, the value of the cover ratio may not be relevant.

To compensate the number of segments problem, Metric 3 normalizes the occurrences of key as follows:

The number of segments in Memory A is 60 (Assumption).
The number of segments in Memory B is 30 (Assumption).
The normalization factor is calculated by the number of segments in memory divided by the number of segments in source.

The normalization factor for Memory A=60/20=3.
The normalization factor for Memory B=30/20=1.5.
The normalized cover ratio for Memory A=(1/3+4/3+9/3+3/3)/20->(1/3+4/3+8/3+3/3)=0.2666=26.67%.
The normalized cover ratio for Memory B=(5/1.5+3/1.5+2/1.5+10/1.5)/20->(1/1.5+3/1.5+2/1.5+2/1.5)/20=0.2666=26.67%.

If the occurrence count of a key in memory is bigger than the occurrence count of the key in source, the occurrence count of the key in source is used.

The values of Metric 3 for Memory A and Memory B are the same. So, the selection may need to use other factors in metadata (such as a memory creation date) or Metric 4 in addition.

Metric 4, Inner Product after Normalization, is used to indicate the correlation between source and memory. Each unique key is regard as a dimension. The sample is assumed to have five dimensions.

Inner product is calculated by sum of (the number of the occurrence of a unique key in source)×(the number of the occurrence of the corresponding key in memory after normalization).

The inner product for Memory A=1×1/3+5×4/3+8×8/3+4×3/3+2×0/3=32.333.
The inner product for Memory B=1×1/1.5+5×0/1.5+8×3/1.5+4×2/1.5+2×2/1.5=24.666.

If the occurrence count of a key in memory is bigger than the occurrence count of the key in source, the occurrence count of the key in source is used.

Memory A has bigger inner product, which means the source for Memory A has a stronger correlation than the source for Memory B. If Metric 4 is additionally used, then, Memory A would be selected.

In summary, an exemplary method operates with a plurality of translation memories. Each translation memory includes a plurality of entries, each entry including a first segment having multiple words of text in a first natural language, and a second segment having text in a second natural language. To register a translation memory, the method generate a respective first segment key the for each first segment of the translation memory.

This method includes generating file segments in accordance with a content of a file to be translated; and generating a metric (such as metric 2, 3, or 4) for each translation memory, each metric being a strictly increasing function of a number of file segments corresponding to a first segment of the translation memory. The method then selects a translation memory in accordance with the generated metrics, allowing a user to translating the file by using the selected translation memory.

To determine whether a file segment corresponds to a first segment of a translation memory, the method generates a file segment key, responsive to a content of the file segment, and compares the file segment key to each first segment key of the translation memory. If the comparison results in a match, the file segment is deemed as corresponding to a first segment of a translation memory.

A More Detailed Example—Key Generation

Key generator 136 (FIG. 7) will now be described in more detail. The basic key generated by generator 136 is the concatenation of the initial letter of each word. Thus, if the English source sentence is: "If you do not specify a temporary work file, the DB2 uses the default, SYSUT1", the basic key of this sentence is i+y+d+n++a+t+w+f+t+d+u+t+d+s="iydnsatwftdutds"

According to an additional feature, articles (such as "a", "an", and "the") are not included when generating the key.

According to another additional feature, words that are shorter than the specified length, shorter than 2 characters for example, are not included when generating the key.

Then, the generated key is "iydnstwfduds".

According to another additional feature, the verb "to be" "is not included when generating the key. (The reason why articles and the verb "to be" are considered noise is that the use of them would vary by writers and/or situations, while providing the same meaning.

Thus, this exemplary key generation method effects a type of hash function.

Different sentences may result in the same key.

The aim of this scheme is to find a possible reusable sentence not necessarily to find an exact match sentence.

Second Exemplary System

FIG. 12A shows system 2 according to a second exemplary embodiment of the present invention. Content management engine 310 and translation memory repository 315 are in Paris, France. Content management engine 310 operates with Metadata repository 320, via a computer network, to perform the translation memory registration and search processes described above in connection with the first exemplary system.

Metadata repository 320 is located in Raleigh, N.C., United States.

Content management engine 330, translation memory repository 335, and memory management tool 210, are in Shanghai, China. Content management engine 330 operates with Metadata repository 320, via a computer network, to perform translation memory registration and search processes. More specifically engine 330 receives translation memory 337, and extracts the source parts of the segments from translation memory 337.

Engine 330 generates a key for each extracted source part of translation memory 337. Usually, a key will be shorter than its corresponding source part, as described above.

As depicted at step 1 in FIG. 12A, engine 330 writes each generated key, in association with information about translation memory 337, into metadata repository 320, as described in more detail above in connection with FIG. 8.

Engine 330 writes translation memory 337, in its native format, into translation memory repository 335.

Content management engine 310 and translation memory repository 315 are in Paris, France. Content management engine 310 operates with metadata repository 320, via a computer network to perform translation memory registration and search processes. Engine 310 receives translation memory 317, and extracts the source parts of the segments from translation memory 317.

Engine 310 generates a key for each extracted source part of translation memory 317. Usually, a key will be shorter than its corresponding source part, as described above.

As depicted at step 1.1 in FIG. 12B, engine 310 writes each generated key, in association with information about translation memory 317, into metadata repository 320, as described in more detail above in connection with FIG. 8.

Engine 310 writes the translation memory 317, in its native format, into translation memory repository 315.

Subsequently, a user in Shanghai invokes engine 330 to enable selection of a translation memory to be used to translate file 130. Engine 330 creates segments from text in file 130 to be translated. Key generator 136, in engine 330, generates a key 138 for each segment of file 130. (step 2).

Engine 330 compares keys 138 to keys 137 in metadata repository 320. Engine 330 generates respective metrics for memory 317 and memory 337 based on the comparison results, as described above. (step 3).

In this case, engine 330 selects memory 337 because metric 2 for memory 337 is higher than metric 2 for memory 317. The user thus uses memory 337 and tool 210 to translate file 130. (step 4).

Thus, in this case of translating file 130, the selected translation memory 337 is geographically closer to the user than metadata repository 320.

Subsequently, as shown in FIG. 12B, the user in Shanghai invokes engine 330 to enable selection of a translation memory to be used to translate file 132. Engine 330 creates segments from text in file 132 to be translated. Key generator 136, in engine 330, generates a key 138 for each segment of file 132. (step 2.1).

Engine 330 compares keys 138 to keys 137 in metadata repository 320. Engine 330 generates respective metrics for memory 317 and memory 337 based on the comparison results, as described above. (step 3.1).

In this case, engine 330 selects memory 317 because metric 2 for memory 317 is higher than metric 2 for memory 337. The user thus uses memory 317 and tool 210 to translate file 132. (step 4.1).

Thus, in this case of translating file 132, the selected translation memory 317 is geographically remote from the user.

Thus, system 2 has common meta-data and geographically distributed translation memories. To register translation memory 317, engine 310 writes memory 317, in its native format, into repository 315, which includes a magnetic storage disk. Engine 310 also writes a representation, of the first parts of memory 317, into repository 320.

To register translation memory 337, engine 330 writes memory 337, in its native format, into repository 335, which includes a magnetic storage disk. Engine 330 also writes a representation, of the first parts of memory 337 into repository 320.

Subsequently, an engine, such as engine 340 in Tokyo, receives text to be translated, and selects one of a plurality of candidate translation memories, by generating metrics, to correlate the text to be translated with a content of repository 320.

A content management engine need not be deployed at the central site with metadata repository 320.

Thus, the exemplary embodiments of the present invention enable management of translation memories.

Throughout this Patent Application, certain processing may be depicted in serial, parallel, or other fashion, for ease of description. Actual hardware and software realizations, however, may be varied depending on desired optimizations apparent to one of ordinary skill in the art.

In this Patent Application, the word circuitry encompasses dedicated hardware, and/or programmable hardware, such as a central processing unit (CPU) or reconfigurable logic array, in combination with programming data, such as sequentially fetched CPU instructions or programming data for a reconfigurable array. Thus, circuitry encompasses, for example, a general-purpose electronic processor programmed with software, acting to carry out a described function.

Additional advantages and modifications will readily occur to those skilled in the art. The invention in its broader aspects is therefore not limited to the specific details, representative apparatus, and illustrative examples shown and described. Accordingly, departures may be made from such details without departing from the spirit or the scope of Applicants' general inventive concept. The invention is defined in the following claims. In general, the words "first," "second," etc., employed in the claims do not necessarily denote an order.

What is claimed is:

1. A method comprising:

receiving a first memory having a plurality of sets in a native format of a first computer program, each set including a first part in a first human language and a corresponding second part in a second human language, the first computer program including logic to search for text strings in the sets of the first memory;

generating a representation, of the first parts of the first memory, in a third format;

writing the representation, of the first parts of the first memory, into an index of a database;

receiving a second memory having a plurality of sets in a native format of a second computer program, each set including a first part in the first human language and a corresponding second part in the second human language, the second computer program including logic to search for text strings in the sets of the second memory, the second computer program not including logic to search for text strings in the sets of the first memory;

generating a representation, of the first parts of the second memory, in the third format;

writing the representation, of the first parts of the second memory, into the index;

receiving text to be translated;

correlating the text to be translated with the first memory and with the second memory, by using a processor to search the index;

selecting a memory, depending on the correlating step; and translating the file by reading second parts of the selected memory.

\* \* \* \* \*